United States Patent
Hedberg et al.

(10) Patent No.: US 6,527,949 B1
(45) Date of Patent: Mar. 4, 2003

(54) LANDSCAPING POND SYSTEM

(75) Inventors: Stephen J. Hedberg, Minnetonka, MN (US); Josette E. Caldwell, Minnetonka, MN (US); Timothy J. Walker, St. Louis, MO (US)

(73) Assignee: Hedberg Aggregates, Inc., Plymouth, MN (US)

( * ) Notice: Subject to any disclaimer, the term of this patent is extended or adjusted under 35 U.S.C. 154(b) by 0 days.

(21) Appl. No.: 09/858,250

(22) Filed: May 15, 2001

(51) Int. Cl.[7] .............................. A01K 63/04; B05B 1/36
(52) U.S. Cl. .................... 210/170; 210/416.2; 210/169; 239/20; 239/193; 119/259
(58) Field of Search .................... 210/167, 169, 210/170, 416, 2, 452, 474, 477; 239/16, 17, 20, 193, 211, 289; 119/259, 261

(56) References Cited

U.S. PATENT DOCUMENTS

| | | | |
|---|---|---|---|
| 2,996,189 A | 8/1961 | Salterbach | |
| 3,067,879 A | 12/1962 | Baker | |
| 3,252,576 A * | 5/1966 | Miller | ......................... 210/169 |
| 3,268,079 A * | 8/1966 | Sharrow, Jr. | ................. 210/169 |
| 3,428,178 A | 2/1969 | Nash | |
| 3,508,661 A | 4/1970 | Diemond et al. | |
| 3,513,978 A | 5/1970 | Newsteder | |
| 4,002,566 A | 1/1977 | Smith | |
| 4,151,810 A | 5/1979 | Wiggins | |
| 4,426,286 A * | 1/1984 | Puckett et al. | ............... 210/169 |
| 4,498,984 A | 2/1985 | Colson | |
| 4,606,821 A | 8/1986 | D'Imperio | |
| 4,606,822 A | 8/1986 | Miller | |
| 4,684,462 A | 8/1987 | Augustyniak | |
| 4,762,258 A | 8/1988 | Engelder | |
| 4,818,389 A | 4/1989 | Tobias et al. | |
| 4,826,591 A | 5/1989 | Macia | |
| 4,915,828 A | 4/1990 | Meyers et al. | |
| 5,083,528 A | 1/1992 | Strong | |
| 5,084,164 A | 1/1992 | Del Rosario | |
| 5,085,766 A | 2/1992 | Born | |
| 5,171,438 A | 12/1992 | Korcz | |
| 5,228,999 A | 7/1993 | Yang | |
| 5,242,582 A | 9/1993 | Marioni | |
| 5,277,800 A | 1/1994 | Diekmann et al. | |
| 5,288,400 A | 2/1994 | Philips | |
| 5,306,421 A | 4/1994 | Weinstein | |
| 5,518,611 A | 5/1996 | Bresolin | |
| 5,584,991 A * | 12/1996 | Wittstock et al. | ............ 210/170 |
| 6,054,045 A * | 4/2000 | Wittstock et al. | ......... 210/416.2 |
| 6,152,381 A * | 11/2000 | Hones | .......................... 239/193 |
| 6,290,844 B1 * | 9/2001 | Tennyson, Jr. | ............... 210/170 |

* cited by examiner

*Primary Examiner*—Christopher Upton
(74) *Attorney, Agent, or Firm*—Gray Plant Mooty Mooty & Bennett, P.A.

(57) ABSTRACT

A man-made aquatic environment comprises a falls assembly and a skimmer assembly. The falls assembly has features designed to help the assembly blend into the surrounding landscape. The skimmer assembly has a removable bucket for holding filter media and other means for removing debris from the water before it is pumped from the skimmer to the falls assembly. Various features of the falls and skimmer assemblies are optimized for manufacturing and storage prior to installation.

11 Claims, 7 Drawing Sheets

LANDSCAPING POND SYSTEM

TECHNICAL FIELD

This invention concerns man-made aquatic environments, particularly landscaping ponds.

BACKGROUND

Ponds are popular elements of modern landscaping design. Typically such ponds include some system for circulating water within the pond. Examples include the systems shown in U.S. Pat. No. 5,584,991 (Wittstock et al.), and U.S. Pat. No. 6,054,045 (Wittstock et al.), the entire contents of both of which are incorporated by reference.

DISCLOSURE OF INVENTION

One aspect of the invention is a falls for a landscaping pond system. The falls comprises a retaining lip arranged to prevent unintentional dislodging of material into the falls. In other embodiments, the falls further comprises a recessed ledge lying beneath the retaining lip; or a vertical retaining wall, lying at an outermost extent of the falls, the recessed ledge lying between the retaining lip and the vertical retaining wall; or a plurality of slots in the retaining lip.

Another aspect of the invention is a skimmer assembly for a landscaping pond system. The skimmer assembly comprises a non-porous skimmer tub and a filter bucket adapted to fit within the skimmer tub. The filter bucket has any combination of a porous bottom, and at least one porous lower sidewall, both or either. The filter bucket fits within the skimmer tub to form a plurality of chambers (typically but not necessarily two chambers), each chamber capable of housing an independent pump system. The outputs of each independent pump system are directed through sidewalls of the skimmer tub.

BRIEF DESCRIPTION OF THE DRAWINGS

The figures are schematic illustrations only.

FIGS. 2B–2E are cutaway views taken along the line 2—2 of FIG. 2A.

DETAILED DESCRIPTION

This invention includes specific components of a man-made aquatic environment system. This system includes components installed and maintained to perform a series of required functions. These functions include water oxygenation, algae control, water flow management, collection of surface debris, and creation of a landscaped water volume suitable to support aquatic flora and fauna.

Figure 1:
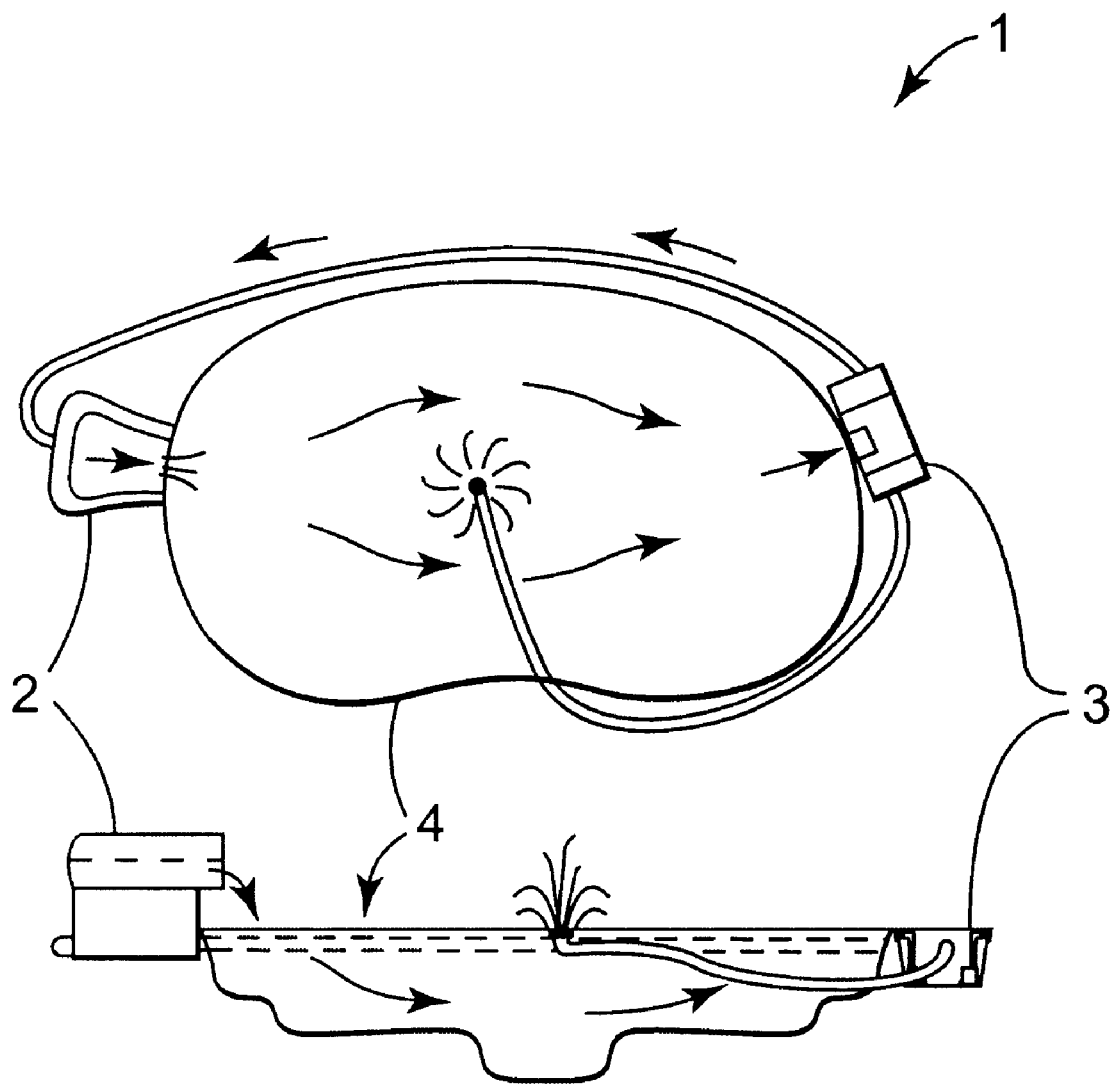
FIG. 1 includes a top and side elevation view of a falls, pond, and skimmer.

FIG. 1 shows that one preferred embodiment of the man-made aquatic environment system has two primary components, commonly referred to as a falls assembly (or falls) 2, and a skimmer assembly (or skimmer) 3. The falls 2 contains no moving parts. The falls is a container that serves as the elevated origin of the water supply to the waterfall, stream, and pond (shown schematically as pond 4). The skimmer 3 serves several functions. The skimmer houses at least one pump to create water flow. This water flow is important to the algae cleaning design, the falls flow appearance, and the ability to skim debris from the surface of pond 4.

The falls unit 2 is the most exposed component of the man-made aquatic system 1. Aquatic systems tend to support growth of undesirable algae on rocks and other objects at the bottom of the pond, as well as on rocks typically included in the falls unit 2. Thus, the falls 2 must have enough water volume to contain and support de-nutrifying bacteria. The man-made components of the falls container should be hidden or blended into the overall landscaping. FIGS. 2A–E are perspective views of embodiments of falls 2 according to the invention. Falls 2 is a container of water having an elevated mouth or other region from which excess water, pumped into the falls, flows out of the falls and into the pond. The exact shape of falls 2 (e.g., generally rectangular as illustrated) is not critical to the scope of the invention.

Figure 2A:
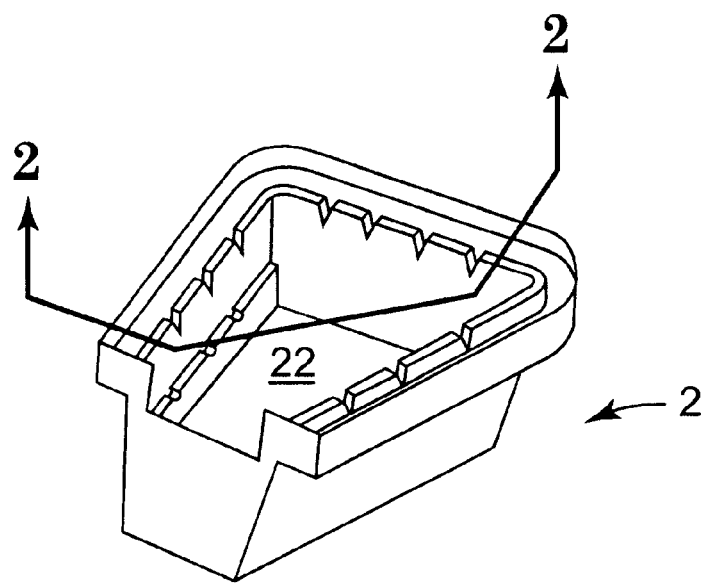
FIGS. 2A–2E are side isometric views of the falls component of the invention.
Figure 2B:
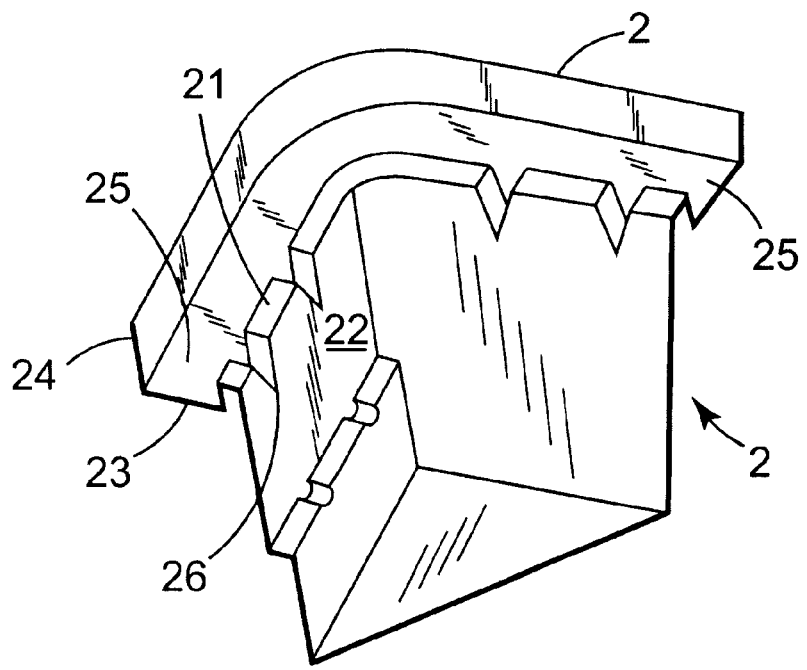
Figure 2C:
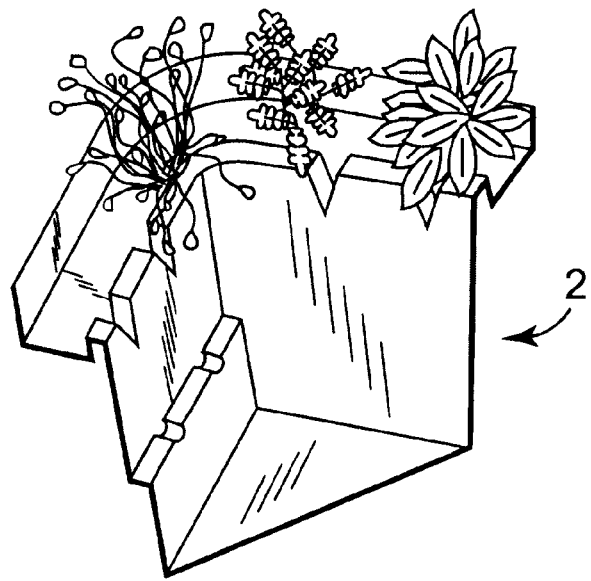
Figure 2D:
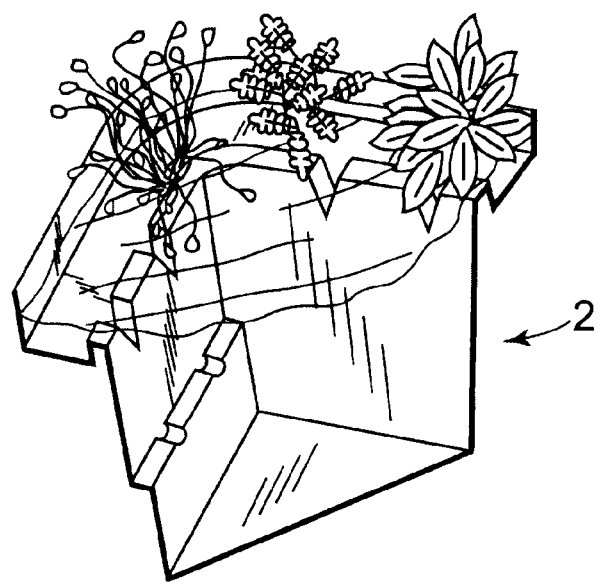
Figure 2E:
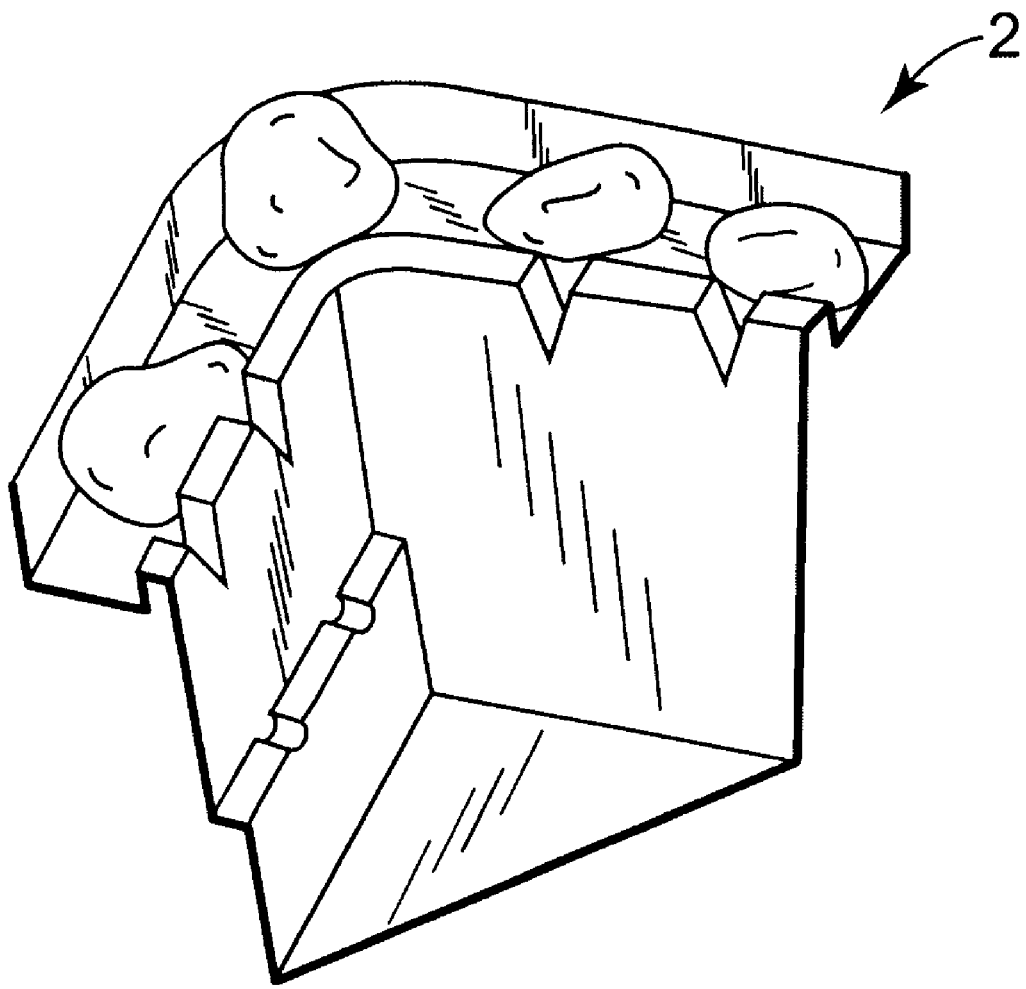

In the specific embodiments shown, a retaining lip 21 lies generally around the upper periphery of, and prevents unintentional dislodging of rocks into, the main container 22. A recessed ledge 23 lies beneath retaining lip 21. Recessed ledge 23 lies between retaining lip 21 and vertical retaining wall 24. In the preferred embodiment shown, recessed ledge 23 is somewhat U-shaped (although the exact cross-sectional shape is not critical). Thus, recessed ledge 23 is additionally capable of providing a volume 25 that is fed by water flowing outwardly from main chamber 22 through at least one of a plurality of water passages 26 in retaining lip 21. The number and shape of water passages 26 is not critical to the scope of the invention. V-shaped water passages 26 are illustrated, but U-shaped, rectangular, curved, etc. shapes are all within the scope of the invention. Passages open to the air above (as opposed to holes through retaining lip 21) are preferred to avoid clogging, and to add reinforcing strength. However, the use of holes through retaining lip 21 is within the scope of the invention. The free flow of water back and forth helps prevent stagnant water. This provides water to nourish aquatic plants (as shown in FIGS. 2C and 2D). Another, independent, advantage of recessed ledge 23 is that it will help retain landscaping rocks (as shown in FIG. 2E). It is also possible to use both plants and rocks together in any combination desired.

Figure 3B:
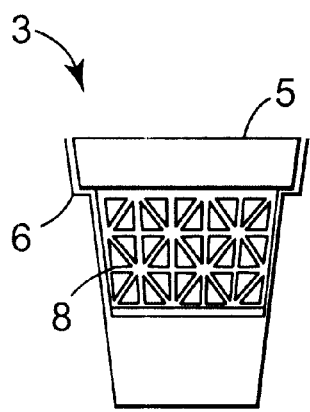
FIG. 3B is a side view taken along the line 3B—3B of FIG. 3A.
Figure 3A:
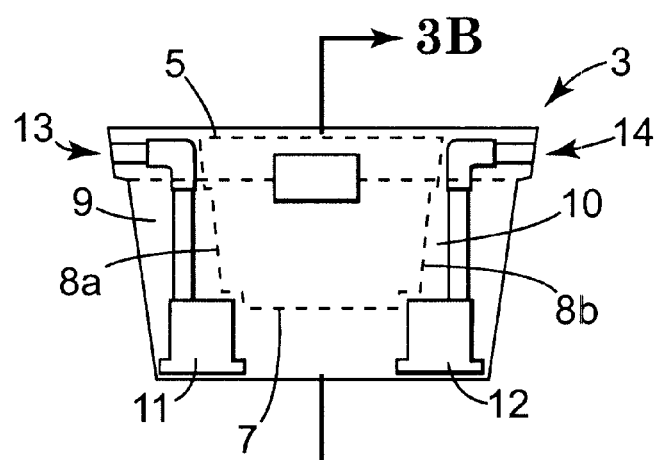
FIGS. 3A is a side view of the skimmer assembly component of the invention.
Figure 4A:
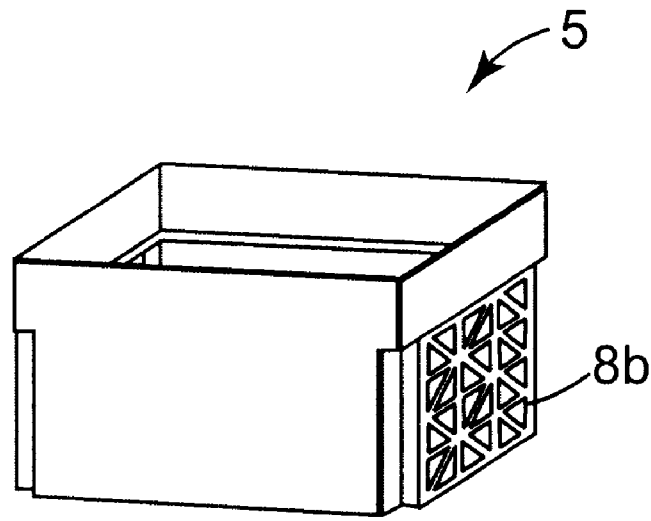
FIGS. 4A and 4B are oblique views of the filter basket component of the skimmer assembly of FIGS. 3A and 3B.
Figure 4B:
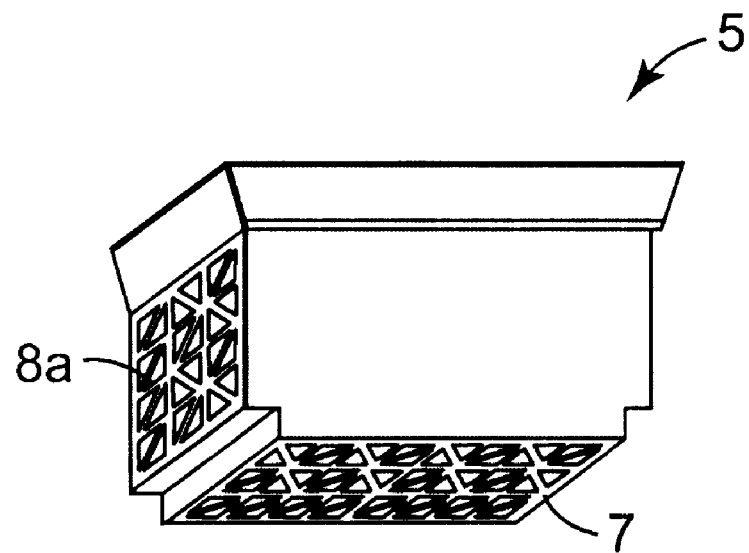

FIGS. 3A and 3B show an improved skimmer 3, comprising a filter bucket 5 which fits within a skimmer tub 6. (Both filter bucket 5 and skimmer tub 6 are shown as generally rectangular but this is only an example and not a limitation on the scope of the invention.) Filter bucket 5, shown specifically in FIGS. 4A and 4B, has porous bottom 7 and lower sidewalls 8a, 8b against which conventional fine filter media (not shown) may be positioned and held in place in any convenient manner. A net for capturing large material (not shown) can be positioned horizontally across the top of the assembly, using any conventional technique. In general, filter bucket 5 need have only at least one porous face (i.e., a porous bottom or a porous sidewall), but embodiments having multiple porous faces are preferred.

This bucket design enables a "dry hands" removal of the filter media. This design also has no below water level tolerance fits between the filter bucket 5 and the tub 6, which eliminates the problem of debris in the water bypassing the filters.

The invention is superior to designs using horizontal filter media, because the latter presents interference problems with respect to pump installation and removal. Specifically, an installer must cut out a corner of the filter media to conform around the pump and output water piping. This poor tolerance cutout creates an opportunity for debris to bypass the filter media bypass, thus subsequently clogging the pump. In vertical filter designs, because of the location of the pump relative to the filter, the water tends to flow at one point at the bottom of the filter, then draws down the water level and eventually starves the pump of water. Thus can lead to either pump failure (if the pond is starved of water) or poor pond circulation, which in turn creates a number of problems, including decreased skimming efficiency, less oxygenation of the water, and an unbalanced ecosystem.

As shown in FIG. 3, filter bucket 5 fits within the skimmer tub 6 to form at least one pump chamber. In the preferred embodiment shown, there are two side chambers 9, 10, each capable of holding respective independent pump systems 11, 12. Prior art skimmer assemblies, whether using vertical or horizontal filter media, have space for only a single pump per skimmer container. The prior designs do not easily accommodate a second pump. By contrast, the invention permits use of a second pump in the skimmer assembly for water aeration, pond fountains, or secondary falls. Even if a second pump chamber is provided, it is not necessary to install or use the second pump if it is not desired to do so.

The outputs of the pumps are directed out the skimmer faces at points 13 and 14, on a direct route to the falls assembly. Prior systems are designed to direct output flow piping away from the skimmer inlet, which creates piping inefficiencies. It is a design requirement that the output of the skimmer be directed to the falls unit, thus creating the falls water flow. Directing the skimmer output directly away from the pond adds to the piping length, or requires a ninety-degree elbow; each creates added water friction and reduced pump flow output.

Figure 5A:
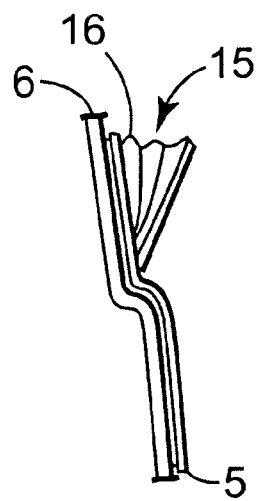
FIG. 5A is a side cutaway view of the weir component of the invention, taken along line 5A—5A of FIG. 5B, which is a perspective view.
Figure 5B:
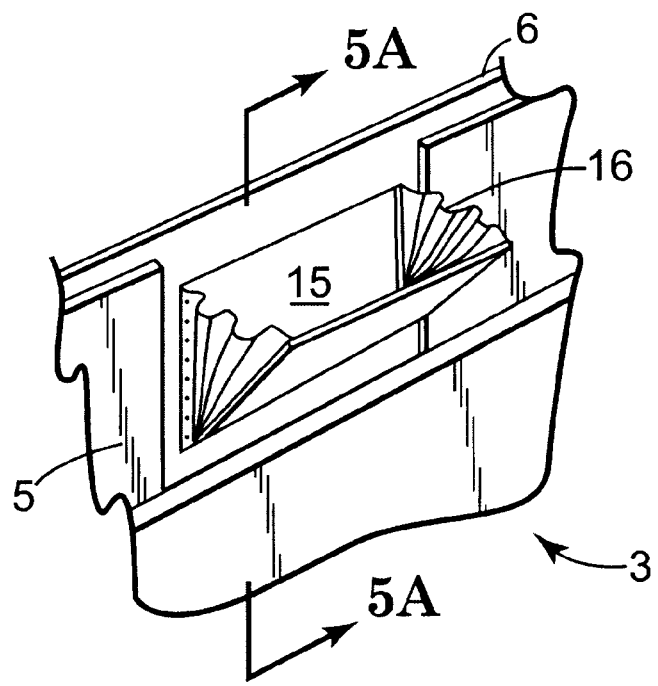

As shown in FIGS. 5A and 5B, the skimmer assembly 3 includes a weir 15 in the side of skimmer tub 6 to control the intake of oxygen-rich water (top surface water) and floating debris. Weir 15 comprises a simplified sidewall 16 made from a folding or flexible material. To promote best skimming and minimize the skimmer exposure, the weir is mounted on the inside of the skimmer tub. This interior location creates a geometric interference with the skimmer net (not shown) and filter removal. A skimmer that closes flush to the skimmer interior wall is desirable. The filter basket 5 has a cutout as required to accommodate weir 15.

Therefore, as compared to prior landscaping pond systems, the invention provides a more natural appearing, less conspicuous blending of the falls assembly into the surrounding landscaping; an improved design for manufacturing of a sidewall, low protrusion weir assembly; and a skimmer assembly with reduced filter bypass, easier filter removal, and geometry compatible to common multiple pump applications.

We claim:

1. In a landscaping pond system, a falls comprising a container having an elevated mouth, an upper periphery, a main container below the upper periphery, and a retaining lip adjacent the upper periphery arranged to prevent unintentional dislodging of material into the main container.

2. The falls of claim 1, further comprising a recessed ledge lying beneath the retaining lip.

3. The falls of claim 2, further comprising a vertical retaining wall lying at an outermost extent of the falls, and in which the recessed ledge lies between the retaining lip and the vertical retaining wall.

4. The falls of claim 3, further comprising at least one water passage through the retaining lip.

5. In a landscaping pond system, a skimmer assembly comprising: a non-porous skimmer tub; and a filter bucket adapted to fit within the skimmer tub to form a plurality of chambers, each chamber being adapted for housing an independent pump system; in which the filter bucket comprises at least one porous face.

6. The skimmer assembly of claim 5, in which due porous face is a sidewall.

7. The skimmer assembly of claim 5, in which the porous face is a bottom.

8. The skimmer assembly of claim 5, in which outputs of each independent pump system are directed through faces of the skimmer tub.

9. In a landscaping pond system, a combination of a falls comprising a container having an elevated mouth, an upper periphery, a main container below the upper periphery, and a retaining lip adjacent the upper periphery arranged to prevent unintentional dislodging of material into the main container; a non-porous skimmer tub; and a filter bucket adapted to fit within the skimmer tub; in which the filter bucket comprises at least one porous face.

10. The landscaping pond system of claim 9, in which one porous face is a sidewall.

11. The landscaping pond system of claim 9, in which the porous face is a bottom.

* * * * *